H. JACOB.
Car-Truck Stake-Holder.
No. 42,194.
Patented Apr. 5, 1864.
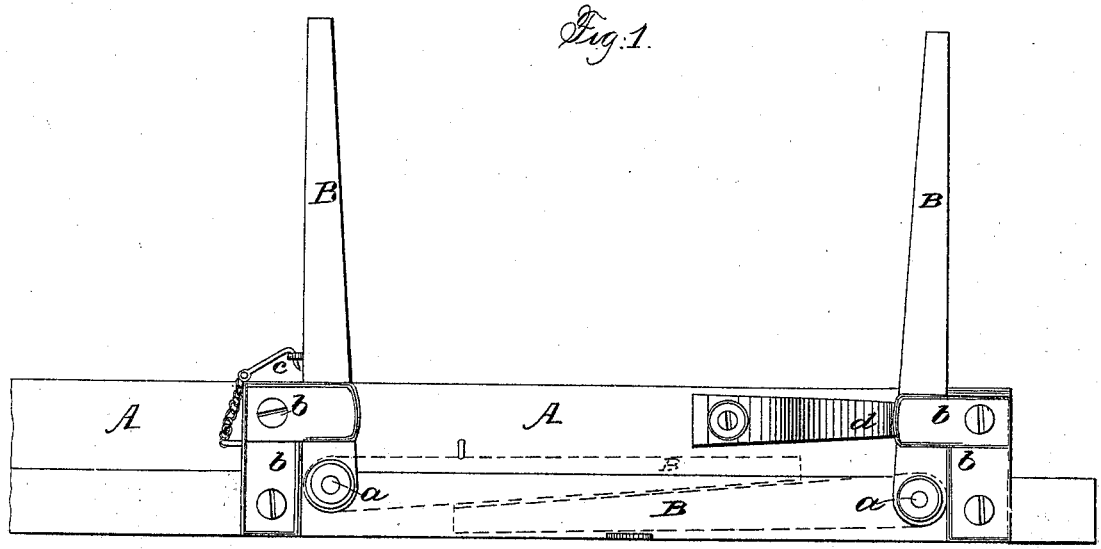
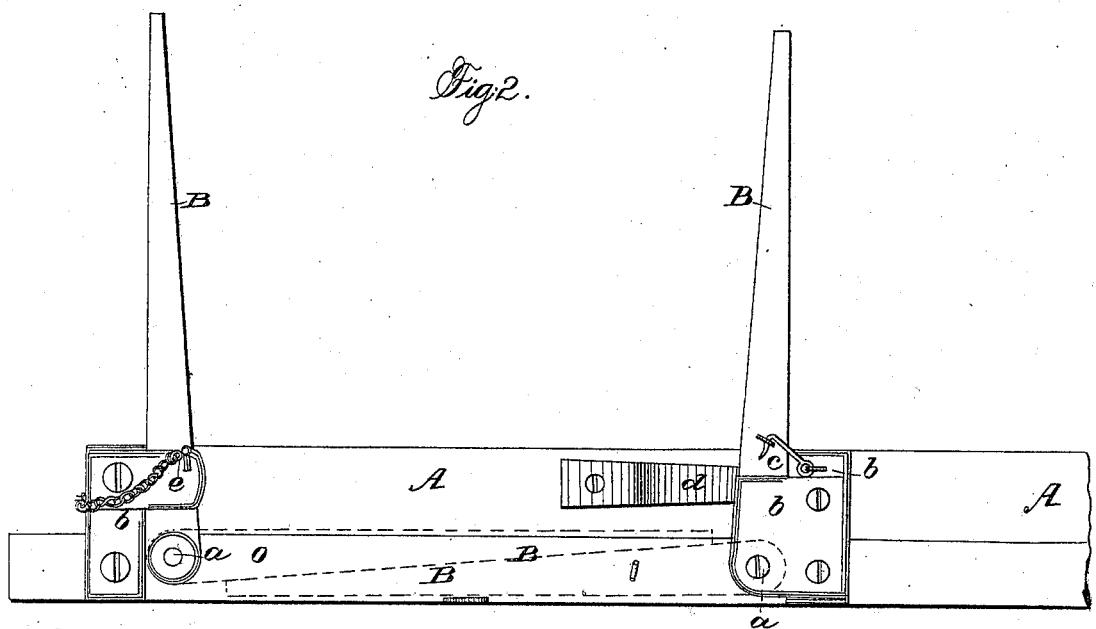
Witnesses
Thos D Patten
A Moore
Inventor
Henry Jacob
By atty A W Singhton

UNITED STATES PATENT OFFICE.

HENRY JACOB, OF LORETTO, PENNSYLVANIA.

IMPROVEMENT IN STANDARDS FOR LUMBER-CARS.

Specification forming part of Letters Patent No. 42,194, dated April 5, 1864.

*To all whom it may concern:*

Be it known that I, HENRY JACOB, of Loretto, in the county of Cambria and State of Pennsylvania, have invented certain new and useful Improvements in the Application of Standards to Lumber and other Cars; and I do hereby declare the following to be a full, clear, and exact description of the same, reference being had to the accompanying drawings, making a part of this specification, in which—

Figure 1 represents a portion of the side of a lumber or wood car with a pair of standards in place, as shown by black lines, and folded down out of the way when not required in use, as shown in red lines. Fig. 2 represents another modification of the same general plan, and only differing in the mode of fastening the standard in an upright position, the upright and horizontal or fold-up positions being shown, the former in black and the latter in red lines.

Similar letters of reference, where they occur in the separate figures, denote like parts in both of them.

Permanent standards are in the way when loading from the side of the car, and hence do not answer the purpose well. Removable standards are constantly being lost or mislaid, and resort is had to temporary ones, which are liable to break or give, and are dangerous.

My invention consists in pivoting or hinging the standards to the side or sides of the car, so that when not required for any special purpose they may be swung or folded down out of the way, and when required instantly raised up into position.

To enable others skilled in the art to make and use my invention, I will proceed to describe the same with reference to the drawings.

A represents the side of an ordinary lumber or platform car, to the sides of which are pivoted or hinged, as at *a*, any suitable number of standards, B, which, when raised up into a vertical position, may find a support against any suitable wood or metal projection, *b*, and be secured against dropping down by a hook and staple, *c*, or by a spring, *d*, or by a pin, *e*, or any other common fastening.

When hoisting or loading long lumber from the side of the car, or when the car is used for some other purpose not requiring standards, they may be swung or folded down out of the way, as shown in red lines in the figures, but, being fast to the car, cannot be lost or mislaid, and are always at hand when required, thus having the requisites of the permanent standard, which is always in place, and the removable standard, to facilitate loading, &c., without either of the disadvantages of the permanent or removable standard. The standards may also be applied to the ends of the cars in the same general way for holding bales, barrels, bags, cord-wood, or any other commodity that is loaded crosswise of the car.

Having thus fully described the nature, object, and purpose of my invention, what I claim therein as new, and desire to secure by Letters Patent, is—

Hinging or pivoting the standards to a lumber or platform car so that they may be raised up into place when required, and swung or folded down out of the way when not required, substantially as herein described.

Witnesses:  HENRY JACOB.
A. B. STOUGHTON,
XAVER. FENDRICH.